US008929663B2

(12) United States Patent
Kondo et al.

(10) Patent No.: US 8,929,663 B2
(45) Date of Patent: Jan. 6, 2015

(54) IMAGE PROCESSING DEVICE IDENTIFYING REGION IN IMAGE AS ONE OF UNIFORM REGION AND NONUNIFORM REGION

(75) Inventors: Masaki Kondo, Toyoake (JP); Ryohei Ozawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 78 days.

(21) Appl. No.: 13/562,121

(22) Filed: Jul. 30, 2012

(65) Prior Publication Data

US 2013/0028524 A1 Jan. 31, 2013

(30) Foreign Application Priority Data

Jul. 29, 2011 (JP) .................................. 2011-167175

(51) Int. Cl.
| | |
|---|---|
| G06K 9/48 | (2006.01) |
| G06K 9/00 | (2006.01) |
| G06K 9/38 | (2006.01) |
| G06K 9/46 | (2006.01) |

(52) U.S. Cl.
CPC .............. G06K 9/00463 (2013.01); G06K 9/38 (2013.01); G06K 9/4642 (2013.01)
USPC ...................................................... 382/199

(58) Field of Classification Search
CPC ........... G06T 2207/10008; G06T 2207/20148; G06T 2207/30176; G06T 7/0081; G06T 7/0085; G06T 2207/20021; G06T 7/0083; G06T 2207/20192
See application file for complete search history.

(56) References Cited

U.S. PATENT DOCUMENTS 6,104,832 A    8/2000    Saito et al.
6,731,801 B2 *   5/2004    Murakawa et al. ........... 382/180
(Continued)

FOREIGN PATENT DOCUMENTS

EP    0516576 A2    12/1992
EP    1006717 A2    6/2000
(Continued)

OTHER PUBLICATIONS

Klink, Stefan et al., Rule-based Document Structure Understanding with a Fuzzy Combination of Layout and Textual Features, International Journal of Document Analysis and Recognition, Jan. 1, 2001, XP55015513, Retrieved from the Internet: URL:http://citeseerx.ist.psu.edu/viewdoc/download?doi=10.1.1.28..4808&rep=rep1&type=pdf [retrieved on Dec. 29, 2011].

(Continued)

*Primary Examiner* — Vu Le
*Assistant Examiner* — Guillermo Rivera-Martinez
(74) *Attorney, Agent, or Firm* — Baker Botts L.L.P.

(57) ABSTRACT

An image processing device includes a processor, and a memory storing computer-readable instructions therein. The computer-readable instructions, when executed by the processor, causes the image processing device to perform: generating edge image data by using the original image data; calculating characteristic values for a plurality of determination regions; and identifying a determination region as a nonuniform region when the characteristic value of the determination region satisfies a prescribed criterion, and the determination region as a uniform region when the characteristic value of the determination region does not satisfy the prescribed criterion. Each of the plurality of determination regions corresponds to one of the characteristic values, represents a part of the edge image, and includes a plurality of pixels, the plurality of determination regions being different from one another, each of the characteristic values characterizing the edge strength of the corresponding determination region.

12 Claims, 8 Drawing Sheets

(56) References Cited

U.S. PATENT DOCUMENTS

| | | | |
|---|---|---|---|
| 7,343,046 B2 * | 3/2008 | Curry et al. | 382/243 |
| 7,505,174 B2 * | 3/2009 | Matsumoto et al. | 358/1.9 |
| 7,508,998 B2 | 3/2009 | Shiiyama | |
| 7,606,419 B2 | 10/2009 | Koshi et al. | |
| 7,672,022 B1 * | 3/2010 | Fan | 358/474 |
| 7,773,776 B2 | 8/2010 | Adachi | |
| 7,844,118 B1 * | 11/2010 | Li et al. | 382/195 |
| 8,194,941 B2 | 6/2012 | Hara | |
| 8,208,774 B2 | 6/2012 | Kudou et al. | |
| 8,249,356 B1 * | 8/2012 | Smith | 382/199 |
| 8,265,393 B2 * | 9/2012 | Tribelhorn et al. | 382/173 |
| 8,320,674 B2 | 11/2012 | Guillou et al. | |
| 8,396,298 B2 | 3/2013 | Dai | |
| 8,520,093 B2 | 8/2013 | Nanu et al. | |
| 2004/0247204 A1 | 12/2004 | Lim et al. | |
| 2005/0180645 A1 * | 8/2005 | Hasegawa et al. | 382/239 |
| 2006/0039608 A1 | 2/2006 | Nishida | |
| 2006/0115169 A1 | 6/2006 | Ohk | |
| 2007/0236707 A1 * | 10/2007 | Shoda | 358/1.2 |
| 2007/0286478 A1 * | 12/2007 | Kishi | 382/162 |
| 2007/0286507 A1 * | 12/2007 | Mori | 382/239 |
| 2008/0101698 A1 * | 5/2008 | Yago | 382/171 |
| 2008/0122877 A1 * | 5/2008 | Aoyama | 345/698 |
| 2009/0148039 A1 * | 6/2009 | Chen et al. | 382/165 |
| 2009/0297024 A1 | 12/2009 | Dai | |
| 2009/0310882 A1 * | 12/2009 | Lin et al. | 382/268 |
| 2010/0142806 A1 * | 6/2010 | Malik et al. | 382/164 |
| 2010/0142854 A1 | 6/2010 | Grunder | |
| 2010/0260417 A1 * | 10/2010 | Dai | 382/165 |
| 2010/0265549 A1 | 10/2010 | Kashibuchi et al. | |
| 2010/0310170 A1 * | 12/2010 | Li et al. | 382/173 |
| 2011/0158529 A1 * | 6/2011 | Malik | 382/173 |
| 2011/0222762 A1 | 9/2011 | Matsuguma et al. | |
| 2011/0252315 A1 * | 10/2011 | Misawa et al. | 715/256 |
| 2012/0057795 A1 | 3/2012 | Konishi | |
| 2013/0027732 A1 | 1/2013 | Ozawa et al. | |
| 2013/0028518 A1 | 1/2013 | Ozawa et al. | |
| 2013/0028520 A1 | 1/2013 | Kondo et al. | |
| 2013/0259365 A1 | 10/2013 | Suzuki et al. | |

FOREIGN PATENT DOCUMENTS

| | | |
|---|---|---|
| JP | H05-081474 A | 4/1993 |
| JP | H05-166002 A | 7/1993 |
| JP | H05-225378 A | 9/1993 |
| JP | H06-056618 B2 | 7/1994 |
| JP | H06-208625 A | 7/1994 |
| JP | H09-114922 A | 5/1997 |
| JP | 2001-127999 A | 5/2001 |
| JP | 2002-176564 A | 6/2002 |
| JP | 2004-362541 A | 12/2004 |
| JP | 2006-085665 A | 3/2006 |
| JP | 2007-310775 A | 11/2007 |
| JP | 2007-336000 A | 12/2007 |
| JP | 2008-282095 A | 11/2008 |
| JP | 2009-123206 A | 6/2009 |
| WO | 2008/039365 A1 | 4/2008 |

OTHER PUBLICATIONS

European Patent Office, extended European Search Report for European Patent Application No. 12178341.9 (counterpart European patent application), dated Nov. 5, 2012.

Pietikainen, Matti et al., "Edge-Based Method for Text Detection from Complex Document Images", Document Analysis and Recognition, 2001, Proceedings, Sixth International Conference on Seattle, WA, USA, Sep. 10, 2001, pp. 286-291.

Zhong, Yu, et al., "Automatic Caption Localization in Compressed Video", IEEE Transactions on Pattern Analysis and Machine Intelligence, IEEE Service Center, Los Alamitos, CA, USA, vol. 22, No. 4, Apr. 1, 2000, pp. 385-392.

Cheng, Shyi-Chyi, et al., "Visual Object Retrieval Via Block-Based Visual-Pattern Matching", Pattern Recognition, Elsevier, GB, vol. 40, No. 6, Mar. 18, 2007, pp. 1695-1710.

Haneda, Eri, et al., "Text Segmentation for MRC Document Compression", IEEE Transactions on Image Processing, IEEE Service Center, Piscataway, NJ, USA, vol. 20, No. 6, Jun. 1, 2011, pp. 1611-1626.

European Patent Office, extended European Search Report for European Patent Application No. 12178346.8 (counterpart European Patent Application), mailed Nov. 12, 2012.

* cited by examiner

FIG. 2
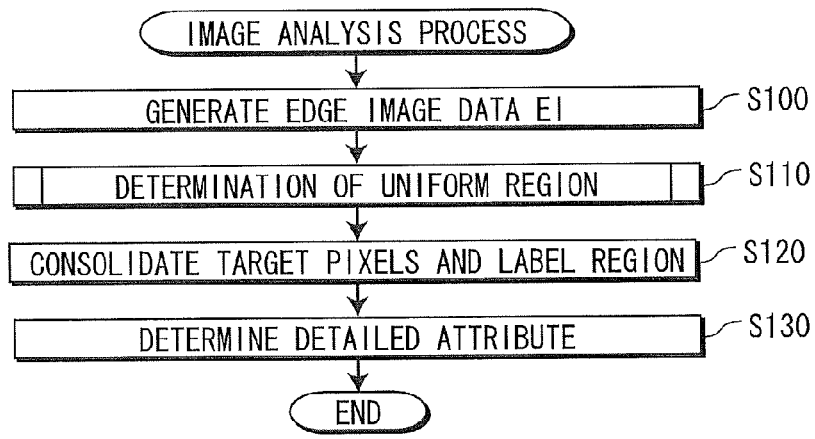
FIG. 3(A)   FIG. 3(B)
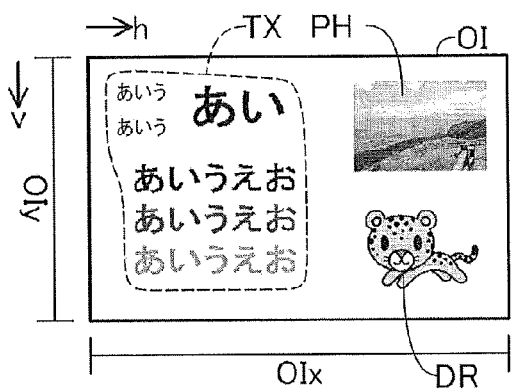
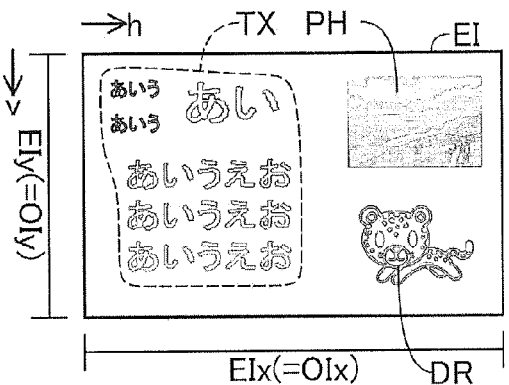
FIG. 4
$$Sed(x,y) = \begin{bmatrix} -1 & 0 & 1 \\ -2 & 0 & 2 \\ -1 & 0 & 1 \end{bmatrix} \begin{bmatrix} P(x-1,y-1) & P(x,y-1) & P(x+1,y-1) \\ P(x-1,y) & P(x,y) & P(x+1,y) \\ P(x-1,y+1) & P(x,y+1) & P(x+1,y+1) \end{bmatrix}$$
$$+ \begin{bmatrix} -1 & -2 & -1 \\ 0 & 0 & 0 \\ 1 & 2 & 1 \end{bmatrix} \begin{bmatrix} P(x-1,y-1) & P(x,y-1) & P(x+1,y-1) \\ P(x-1,y) & P(x,y) & P(x+1,y) \\ P(x-1,y+1) & P(x,y+1) & P(x+1,y+1) \end{bmatrix}$$

$$\text{FLAG (Blp)} = \begin{cases} 1 & (\text{R\_UL=Y or R\_UR=Y or R\_LL=Y or R\_LR=Y}) \\ 0 & (\text{R\_UL=N and R\_UR=N and R\_LL=N and R\_LR=N}) \end{cases}$$

FIG. 11
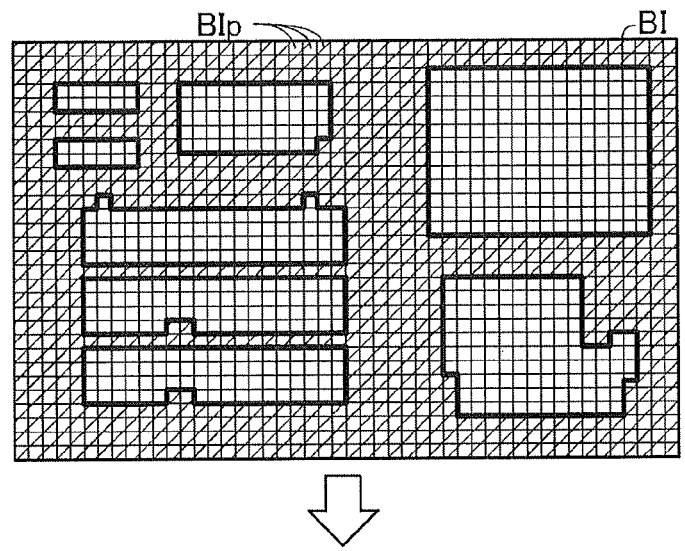
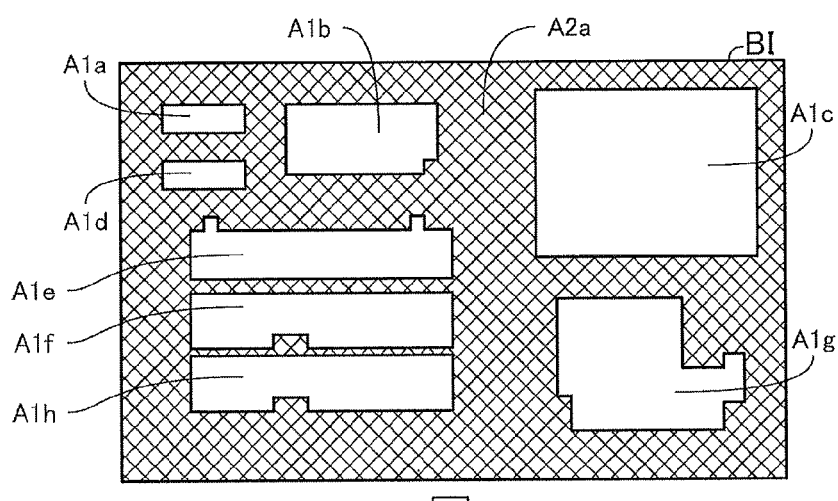
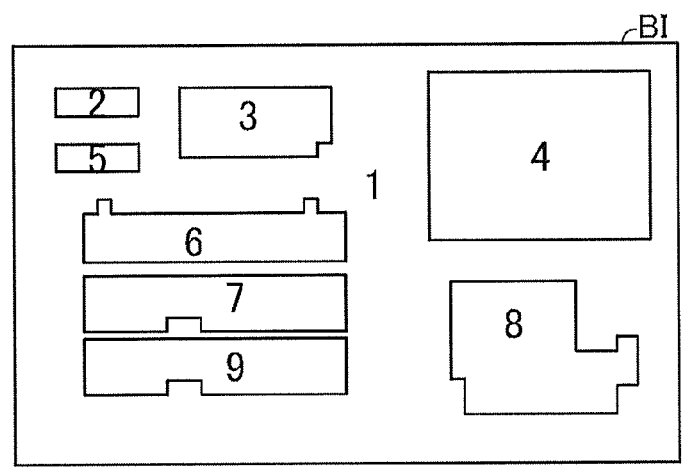

FIG. 12

| DISTRIBUTION WIDTH W | COLOR NUMBER C | PIXEL DENSITY S | ATTRIBUTE |
|---|---|---|---|
| GREATER THAN OR EQUAL TO Wth | GREATER THAN OR EQUAL TO Cth | GREATER THAN OR EQUAL TO Sth | PHOTOGRAPHIC IMAGE |
| | | SMALLER THAN Sth | PHOTOGRAPHIC IMAGE |
| | SMALLER THAN Cth | GREATER THAN OR EQUAL TO Sth | DRAWING IMAGE |
| | | SMALLER THAN Sth | TEXT IMAGE |
| SMALLER THAN Wth | GREATER THAN OR EQUAL TO Cth | GREATER THAN OR EQUAL TO Sth | PHOTOGRAPHIC IMAGE |
| | | SMALLER THAN Sth | TEXT IMAGE |
| | SMALLER THAN Cth | GREATER THAN OR EQUAL TO Sth | DRAWING IMAGE |
| | | SMALLER THAN Sth | TEXT IMAGE |

FIG. 13

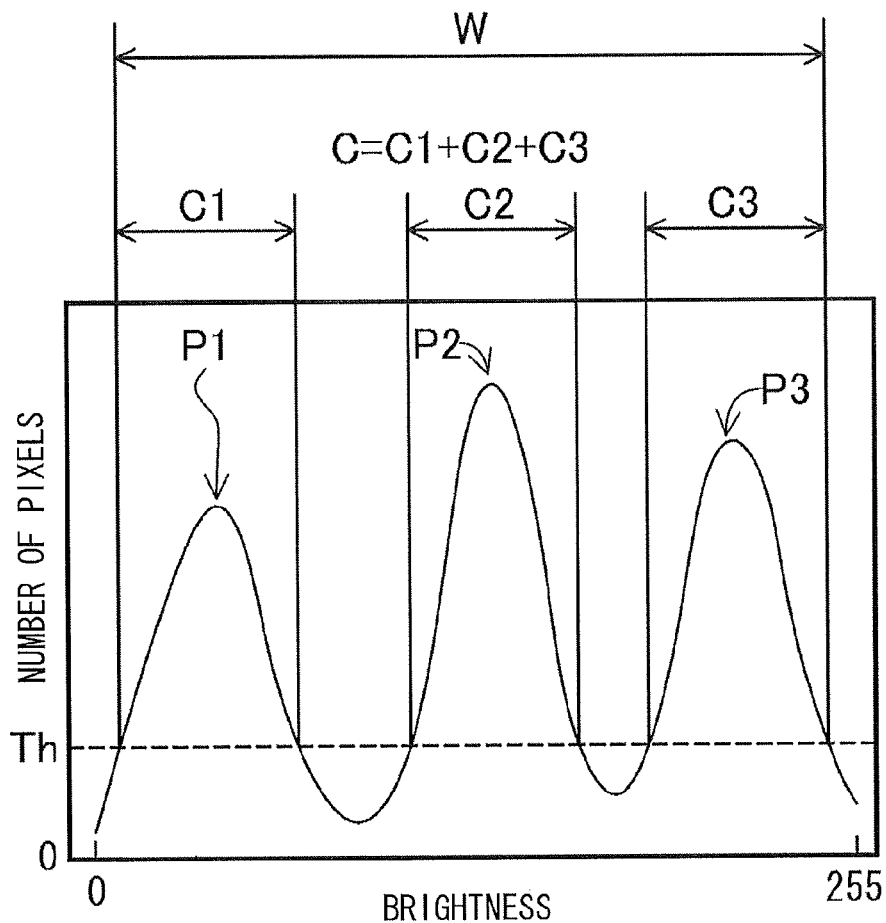

IMAGE PROCESSING DEVICE IDENTIFYING REGION IN IMAGE AS ONE OF UNIFORM REGION AND NONUNIFORM REGION

CROSS REFERENCE TO RELATED APPLICATION

This application claims priority from Japanese Patent Application No. 2011-167175 filed Jul. 29, 2011. The entire content of the priority application is incorporated herein by reference.

TECHNICAL FIELD

The invention relates to an image process for identifying different types of regions within an image.

BACKGROUND

Images have often been processed to identify the layout of the various objects, such as text, within the image. One proposed method of analyzing the layout of objects within an image converts the image into a binary form, extracts sets of white rectangles from the binary image, and uses the extracted sets of white rectangles as separators to divide the page image into several regions.

SUMMARY

However, when there is little difference in color between two neighboring regions of an image having different display content (a region representing text and a region representing the background, for example), these regions often cannot be separated when the image has been converted to a binary format.

In view of the foregoing, it is an object of the invention to improve the precision of an image process for identifying regions of different types within an image.

In order to attain the above and other objects, the invention provides an image processing device configured to process original image data representing an original image including a plurality of pixels. The image processing device includes a processor, and a memory storing computer-readable instructions therein. The computer-readable instructions, when executed by the processor, causes the image processing device to perform: generating edge image data by using the original image data, where the edge image data represents an edge image by edge strengths corresponding to the plurality of pixels; calculating characteristic values for a plurality of determination regions, wherein each of the plurality of determination regions corresponds to one of the characteristic values, represents a part of the edge image, and includes a plurality of pixels, the plurality of determination regions being different from one another, each of the characteristic values characterizing the edge strength of the corresponding determination region; and identifying a determination region as a nonuniform region when the characteristic value of the determination region satisfies a prescribed criterion, and the determination region as a uniform region when the characteristic value of the determination region does not satisfy the prescribed criterion.

According to another aspect, the invention provides a non-transitory computer-readable storage medium storing computer-readable instructions that, when executed by a processor, cause an image processing device configured to process original image data representing an original image including a plurality of pixels, to perform: generating edge image data by using the original image data, where the edge image data represents an edge image by edge strengths corresponding to the plurality of pixels; calculating characteristic values for a plurality of determination regions, wherein each of the plurality of determination regions corresponds to one of the characteristic values, represents a part of the edge image, and includes a plurality of pixels, the plurality of determination regions being different from one another, each of the characteristic values characterizing the edge strength of the corresponding determination region; and identifying a determination region as a nonuniform region when the characteristic value of the determination region satisfies a prescribed criterion, and the determination region as a uniform region when the characteristic value of the determination region does not satisfy the prescribed criterion.

According to still another aspect, the invention provides a method for controlling an image processing device configured to process original image data representing an original image including a plurality of pixels. The method includes: generating edge image data by using the original image data, where the edge image data represents an edge image by edge strengths corresponding to the plurality of pixels; calculating characteristic values for a plurality of determination regions, wherein each of the plurality of determination regions corresponds to one of the characteristic values, represents a part of the edge image, and includes a plurality of pixels, the plurality of determination regions being different from one another, each of the characteristic values characterizing the edge strength of the corresponding determination region; and identifying a determination region as a nonuniform region when the characteristic value of the determination region satisfies a prescribed criterion, and the determination region as a uniform region when the characteristic value of the determination region does not satisfy the prescribed criterion.

BRIEF DESCRIPTION OF THE DRAWINGS

In the drawings:

FIG. 2 is a flowchart illustrating steps in a process executed by an image process unit to analyze an image;

FIG. 3(A) is an example of an original image OI represented by original image data;

FIG. 3(B) is an example of an edge image EI represented by edge image data;

FIG. 4 is an equation to calculate edge strength in the embodiment;

FIG. 11 is schematic diagrams illustrating a process in S120;

FIG. 12 is a table showing conditions for determining attributes; and

FIG. 13 is a brightness histogram.

DETAILED DESCRIPTION

A. First Embodiment

Figure 1:
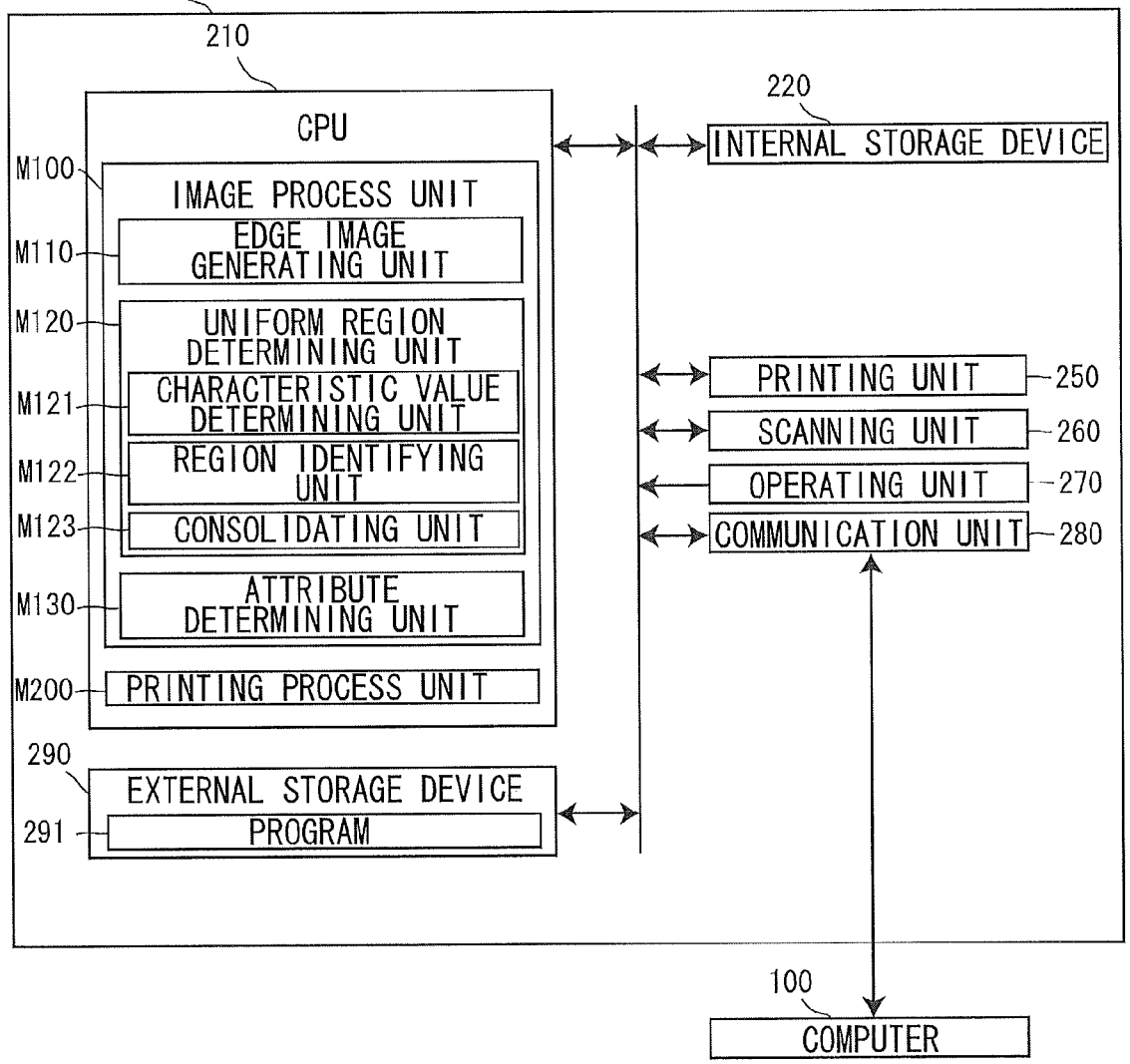
FIG. 1 is a block diagram showing a multifunction peripheral according to an embodiment of an invention.

Next, an embodiment of the invention will be described while referring to the accompanying drawings. FIG. 1 is a block diagram showing a multifunction peripheral 200 serving as a first embodiment of the invention. The multifunction peripheral 200 has a CPU 210, an internal storage device 220 (RAM or other volatile memory, for example), an external storage device 290 (a hard disk drive, solid state drive, or other nonvolatile memory), a printing unit 250, a scanning unit 260, an operating unit 270, and a communication unit 280.

The printing unit 250 prints an image on a printing medium based on image data. The scanning unit 260 generates image data by optically scanning an original image. The operating unit 270 includes a touch panel, buttons, and other operational members that the user can operate. The communication unit 280 is an interface (a USB interface or IEEE 802.3 interface, for example) for communicating with other electronic devices, such as a computer 100 or a digital camera (not shown).

The external storage device 290 stores a program 291. The CPU 210 executes the program 291 to control the overall operations of the multifunction peripheral 200. In the multifunction peripheral 200 according to the embodiment, the CPU 210 operates both as an image process unit M100 and a printing process unit M200. The image process unit M100 includes an edge image generating unit M110, a uniform region determining unit M120, and an attribute determining unit M130. The uniform region determining unit M120 further includes a characteristic value calculating unit M121, a region identifying unit M122, and a consolidating unit M123. These process units will be described later in greater detail. While the CPU 210 functions as these specific process units when executing processes, the process units themselves will be referred to as the executors of the processes in the following description.

FIG. 2 is a flowchart illustrating steps in a process executed by the image process unit M100 to analyze an image. In the embodiment, the image process unit M100 executes this image analysis process each time an image is printed. The multifunction peripheral 200 prints an image in response to a command from the user. For example, when the user presses a Copy button (not shown) on the operating unit 270, the multifunction peripheral 200 optically scans an original that has been placed on the bed (not shown) of the scanning unit 260 and subsequently prints the scanned image with the printing unit 250. More specifically, the scanning unit 260 generates image data representing the original. The image process unit M100 analyzes the image data generated by the scanning unit 260 (hereinafter referred to as "original image data") to identify regions representing objects (text and photographs, for example) and to identify the types of objects. The printing process unit M200 adjusts the image quality based on the type of each object using information on the regions and types of objects identified by the image process unit M100, and controls the printing unit 250 to print the adjusted image.

In S100 at the beginning of the image analysis process in FIG. 2, the edge image generating unit M110 generates edge image data by analyzing the original image data. FIGS. 3(A) and 3(b) are a schematic diagram. FIG. 3(A) shows an example of an original image OI represented by original image data, and FIG. 3(B) shows an example of an edge image EI represented by edge image data. In the example of FIG. 3(A), the original image OI includes a photograph PH, a drawn image DR, and text TX including a plurality of characters. The photograph PH is an image captured through photography. The drawn image DR is a drawn illustration or an image drawn with vector graphics, for example. The text TX is an image representing characters. In the original image OI, a plurality of pixels are arranged in a matrix along rows in a first direction h, and columns in a second direction v orthogonal to the first direction h. A pixel number OIx represents the number of pixels in each row of the original image OI along the first direction h, while a pixel number OIy represents the number of pixels in each column of the original image OI along the second direction v.

The edge image EI expresses the edge strength at pixel positions within the original image OI. A pixel number EIx represents the number of pixels in each row of the edge image EI along the first direction h and is identical to the pixel number OIx for the original image OI, while a pixel number EIy represents the number of pixels in each column of the edge image EI along the second direction v and is identical to the pixel number OIy for the original image OI. Edge strength represents the magnitude of change in pixel values. FIG. 4 shows the method of computing edge strength in the embodiment. The edge image generating unit M110 uses the Sobel operator to calculate edge strength in the embodiment. In FIG. 4, a pixel value P(x, y) represents the value of a pixel in the original image, where x indicates the position of the pixel along the first direction h and y indicates the position of the pixel along the second direction v. As shown in FIG. 4, the edge strength Sed(x, y) for a specific pixel position (x, y) is calculated using an image value Pm of a 3×3 pixel block centered on the pixel position (x, y), and operators Gx and Gy. The operator Gx is used to calculate the magnitude of change in pixel values in the first direction h, while the operator Gy is used to calculate the magnitude of change in pixel values in the second direction v. The edge strength Sed(x, y) is the sum of the absolute value of a value obtained by multiplying the image value Pm of the pixel block by the operator Gx (a first direction component Sx) and the absolute value of a value obtained by multiplying the image value Pm of the pixel block by the operator Gy (a second direction component Sy). In the embodiment, the color of each pixel in the original image OI is expressed by a gradation value for each of the colors red, green, and blue. Hence, the edge image generating unit M110 calculates the edge strength for each of the colors red, green, and blue.

FIG. 3(B) shows a sketch of the edge image EI. Dark colors in FIG. 3(B) indicate high edge strength. The edge strength expressed in FIG. 3(B) is a weighted average of edge strengths for red, green, and blue. The weight used for each color component is the same as the weight used in the equation for calculating luminance (the Y component in the YCbCr color space) from the red, green, and blue color components. As shown in FIG. 3(B), the edge strength is high along the outlines of characters in the region representing the text TX. The edge strength is also high along the outlines of pixels constituting the drawn image DR in the region expressing the drawn image DR. The edge strength is also high in the region expressing the photograph PH where there are great changes in color. The edge strength is lower for areas in which the color change is smaller (uniform areas of the image, such as areas representing the background).

In S110 of FIG. 2, the uniform region determining unit M120 determines uniform regions of the image using the edge image EI. Specifically, the uniform region determining unit M120 identifies uniform regions and nonuniform regions in the original image OI. Each uniform region corresponds to at least part of the original image in which an image is uniformly formed and each ununiform region corresponds to at least part of the original image in which an image is nonuniformly formed. Uniform regions include the background, for example, while nonuniform regions include text, photographs, illustrations, and other objects.

Figure 5:
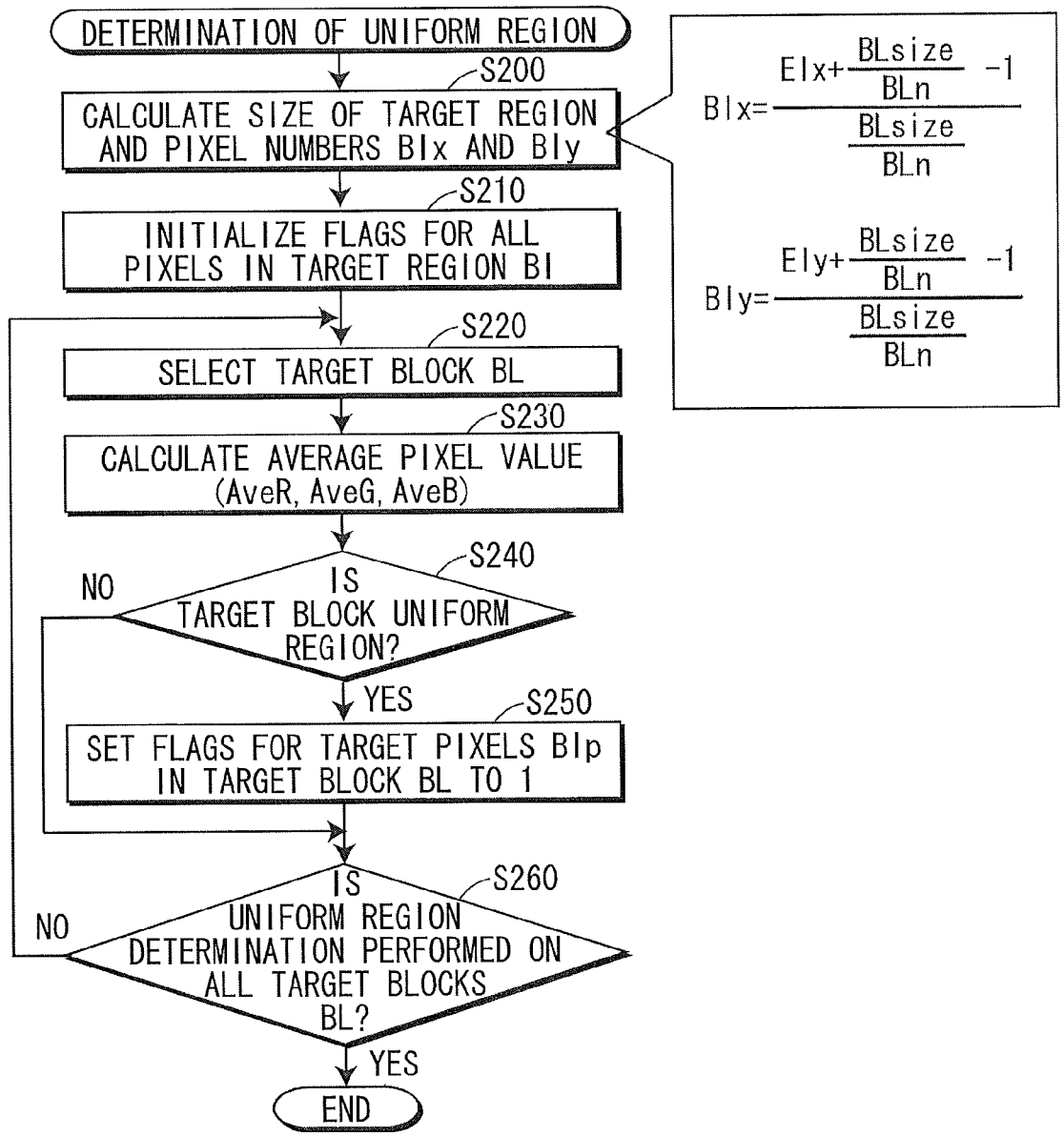
FIG. 5 is a flowchart illustrating steps in a process to determine uniform regions.

FIG. 5 is a flowchart illustrating steps in the process to determine uniform regions. In S200 at the beginning of the process, the region identifying unit M122 calculates the size of a target region BI having a pixel number BIx in the first direction and a pixel number BIy in the second direction. The target region BI is a region representing the result of the uniform region determination. The result of the determination is either "1" (representing a uniform region) or "0" (representing a nonuniform region). A value (flag) for each pixel in the target region BI ultimately represents a determination of "1" or "0", as will be described later in greater detail.

Figure 6:
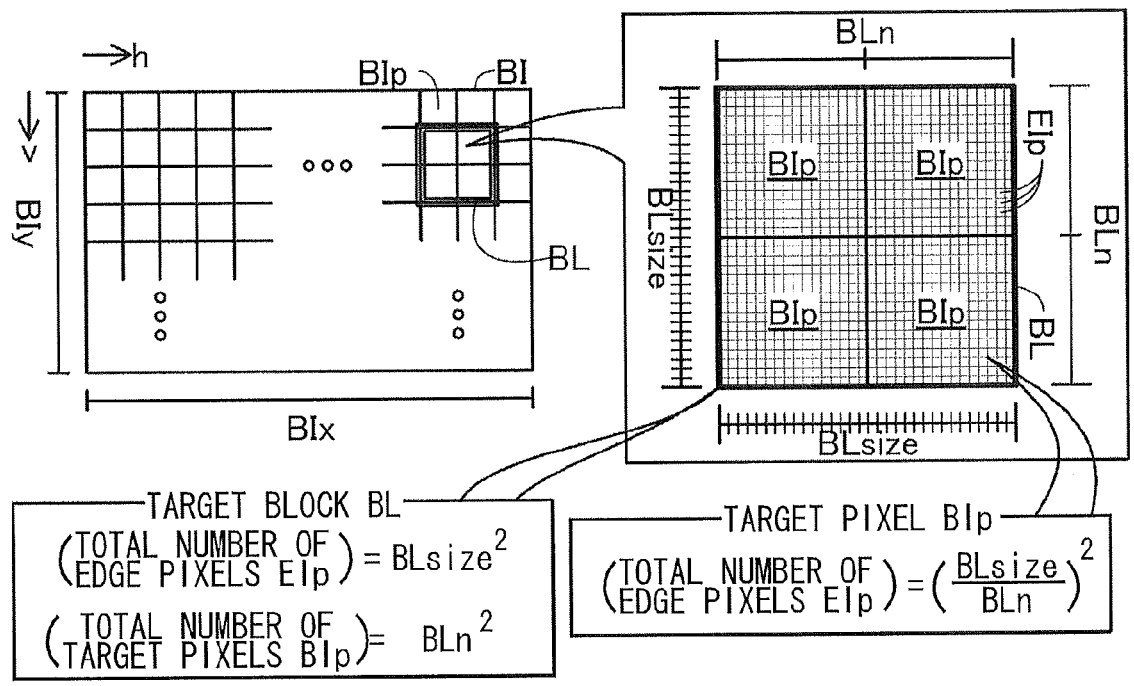
FIG. 6 is a schematic diagram indicating a relationship between a target block BL, a target pixel BIp in the target region BI, and an edge pixel EIp of the edge image EI.

FIG. 6 is a schematic diagram indicating the relationship between a pixel BIp in the target region BI (hereinafter referred to as a "target pixel BIp"), a target block BL, and a pixel EIp of the edge image EI (hereinafter referred to as an "edge pixel EIp"). The target region BI covers the entire edge image EI and is divided into the target pixels BIp. Each target pixel BIp includes 16×16 edge pixels. In the embodiment, a uniform region determination is made for each target block BL. The size and shape of a single target block BL is identical to the size and shape of a block including four target pixels BIp, that is, 2×2 target pixels BIp. A final result of the uniform region determination is set for each target pixel BIp, as will be described later in greater detail. The size and shape of a single target pixel BIp is identical to the size and shape of a block including 16×16 edge pixels EIp. In other words, the size and shape of a single target block BL is identical to the size and shape of a block including 32×32 edge pixels EIp. In other words, the target pixels BIp have a predetermined correlation with the edge pixels such that the target pixels BIp corresponds to 16×16 edge pixels. A block size BLsize in FIG. 6 indicates the number of edge pixels EIp along each of the first direction h and the second direction v in a single target block BL (in the embodiment, the block size BLsize is 32). Further, a target pixel number BLn indicates the number of target pixels BIp in each of the first direction h and the second direction v within a single target block BL (in the embodiment, the target pixel number BLn is 2).

In S200 of FIG. 5, the region identifying unit M122 calculates the number of target pixels BIp required for covering the entire edge image EI when the target pixels BIp are arranged in a matrix configuration. That is, the region identifying unit M122 calculates the number of target pixels BIp in the first direction h and the number of target pixels BIp in the second direction v. The region identifying unit M122 uses the calculated number in the first direction h as the first direction pixel number BIx and the calculated number in the second direction v as the second direction pixel number BIy. The formulae for calculating the pixel numbers BIx and BIy are indicated in S200 of FIG. 5. The pixel numbers BIx and BIy found in these equations are rounded down to the nearest integer. In some cases, the pixel number EIx of the edge image EI differs from a multiple of the number of edge pixels EIp in one target pixel in the first direction h (BLsize/BLn). In this case, a single row of target pixels BIp is added in order to cover pixels remaining after dividing the pixel number EIx for the edge image EI by the number of target pixels BIp in the first direction h according to the equation in FIG. 5 (a similar process is performed for the second direction v).

In S210 the region identifying unit M122 initializes the flags for all pixels in the target region BI to "0".

In S220 the characteristic value calculating unit M121 selects a single target block BL. As will be described later in greater detail, a plurality of target blocks BL are arranged in the embodiment in order to cover the entire target region BI. The characteristic value calculating unit M121 selects an unprocessed target block BL from the plurality of target blocks BL.

In S230 the characteristic value calculating unit M121 calculates, as a characteristic value, the average pixel value within the target block BL selected in S220. The characteristic value characterizes the edge strength in the target block BL. That is, the average pixel value denotes the average value of edge pixels EIp in the target block BL (the edge strength) and is calculated for each of the red, green, and blue color components. As indicated in FIG. 3(B), since the edge strength is low when the target block BL represents a uniform region, the average pixel value is small. Similarly, since the edge strength is high when the target block BL represents a nonuniform region, the average pixel value is large.

In S240 the region identifying unit M122 determines whether the target block BL represents a uniform region based on the average pixel value calculated in S230. If the region identifying unit M122 determines that the target block BL represents a uniform region (S240: YES), in S250 the region identifying unit M122 sets the flags for the target pixels BIp in the target block BL to "1".

Figure 7:
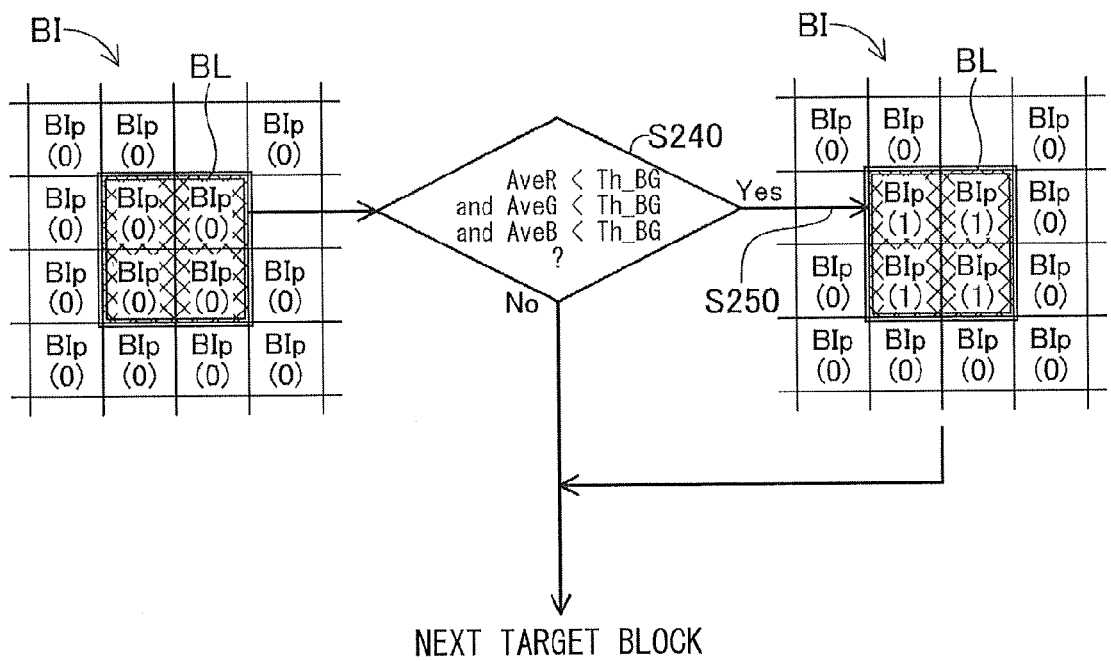
FIG. 7 is a schematic diagram illustrating steps S240 and S250.

FIG. 7 is a schematic diagram illustrating steps S240 and S250. FIG. 7 shows a portion of the target region BI (a plurality of target pixels BIp) and a single target block BL indicated by shading. The number in parentheses provided in each of the target pixels BIp indicates the flag value set for that target pixel BIp. The condition for determining that a target block BL represents a uniform region in the embodiment is that the average red pixel value AveR, the average green pixel value AveG, and the average blue pixel value AveB are all smaller than a prescribed threshold Th_BG (hereinafter referred to as the "uniform condition"). As illustrated in FIGS. 3(B) and 4, since the edge strength is low in portions of an image representing uniform regions, the average pixel value in these regions will be small. Conversely, the edge strength is high in portions of an image representing nonuniform regions, resulting in a large average pixel value. Accordingly, it is highly likely that the target block BL represents a uniform region when the average pixel values AveR, AveG, and AveB for red green and blue meet the uniform condition, and it is highly likely that the target block BL represents a nonuniform region when at least one of the average pixel values do not meet the uniform condition. The prescribed threshold Th_BG is a positive value in the embodiment and should be set through experimentation to improve determination accuracy.

If the target block BL satisfies the uniform condition (S240: YES), in S250 the region identifying unit M122 sets the flags for all target pixels BIp in the target block BL to "1". As shown in FIGS. 6 and 7, a single target block BL includes four target pixels BIp in the embodiment. Hence, in S250 the region identifying unit M122 sets the flags for all four target pixels BIp to "1". If the target block BL does not satisfy the uniform condition (S240: NO), the region identifying unit M122 skips S250 and advances directly to S260.

One determination is made using the average pixel values in a target block BL having a plurality of edge pixels EIp as described above because, even if the original image OI or the edge image EI contains noise, a higher number of pixels used in calculating the average value reduces the effects of noise (such as a single pixel representing noise) and can thereby mitigate the effects of noise on the determination result. Such noise can arise from a variety of causes, such as the optical scanning process or various image processes.

In S260 of FIG. 5, the region identifying unit M122 determines whether the uniform region determination has been performed on all target blocks BL. When there remain unprocessed target blocks BL (S260: NO), the uniform region determining unit M120 repeats the process from S220 to S260. After the process has been completed for all target blocks BL (S260: YES), the uniform region determination ends.

Figure 8:
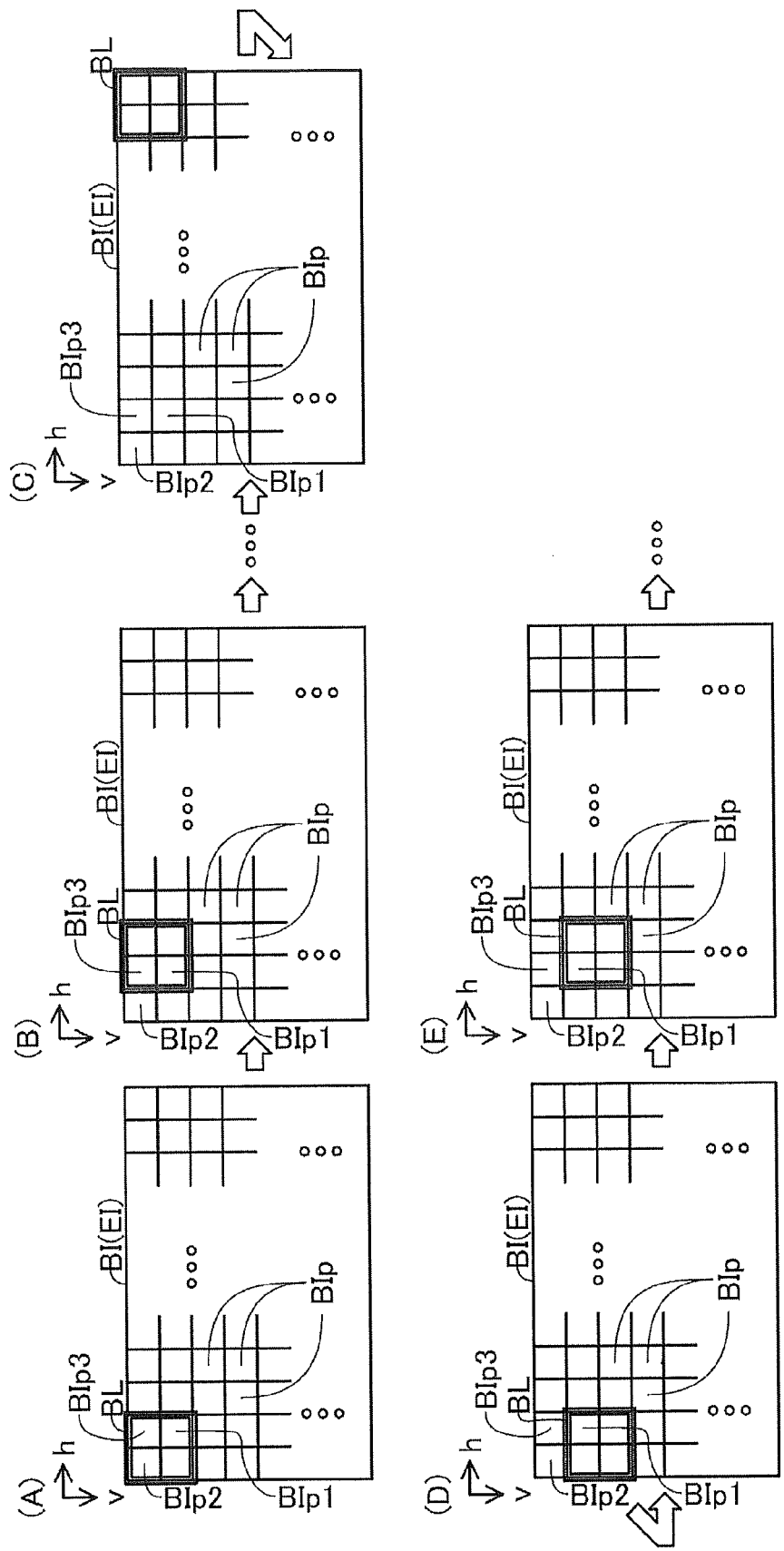
FIG. 8 is a schematic diagram showing an arrangement of the target blocks BL in the target region BI (edge image EI)

FIG. 8 is a schematic diagram showing the arrangement of target blocks BL in the target region BI (edge image EI). FIG. 8 indicates the target region BI (edge image EI), and the target block BL selected in S220 of FIG. 5. While repeating the process in S220-S260, the position of the selected target block BL moves sequentially as shown in (A) through (E) in FIG. 8.

In the embodiment, the characteristic value calculating unit M121 moves the target block BL a distance of one pixel at a time (here, one pixel is equivalent to one target pixel BIp) from the upper left corner of the target region BI to the lower right corner. More specifically, the target block BL begins in the upper left corner of the target region BI and is moved one pixel at a time in the first direction h (see (A), (B), and (C) in FIG. 8). After the target block BL reaches the right edge of the target region BI, the target block BL is moved back to the left edge but shifted one pixel in the second direction v. Thereafter, the target block BL is once again moved one pixel at a time from the left edge of the target region BI toward the right edge but along a line in the first direction h shift one pixel in the second direction v (see (D) and (E) in FIG. 8). By repeating this movement, the target block BL covers the entire region of the target region BI. That is, a plurality of target blocks BL can be arranged at different positions so as to cover the entire target region BI.

As described with reference to FIG. 6, the size and shape of a single target block BL is identical to the size and shape of the block including 2×2 target pixels BIp in the embodiment. Hence, each target block BL overlaps a partial region of at least one other target block BL. For example, the right half of the target block BL shown in (A) of FIG. 8 overlaps the left half of the target block BL in (B) of FIG. 8. Additionally, the bottom half of the target block BL shown in (A) of FIG. 8 overlaps the top half of the target block BL in (D) of FIG. 8. Also, the lower right corner of the target block BL in (A) of FIG. 8 overlaps the upper left corner of the target block BL in (E) of FIG. 8. In this way, a single target pixel BIp or two target pixels BIp in a single target block BL overlap a part of another target block BL. In the embodiment, the plurality of target blocks BL are arranged at intervals shorter than the length of the target block BL in both the first direction h and the second direction v (the interval in the embodiment is equivalent to the size of a single target pixel BIp). In other words, the plurality of target blocks BL is arranged so that each partially overlaps at least one other target block BL.

More specifically, each target pixel BIp that does not constitute an edge pixel of the target region BI (a first pixel BIp1 in FIG. 8, for example) is shared by four overlapping target blocks BL. The four target pixels BIp occupying the four corners of the target region BI (a second pixel BIp2, for example) are each only overlapped by a single target block BL. Further, edge pixels of the target region BI excluding the four corners (a third pixel BIp3, for example) are each overlapped by two target blocks BL.

Figure 9:
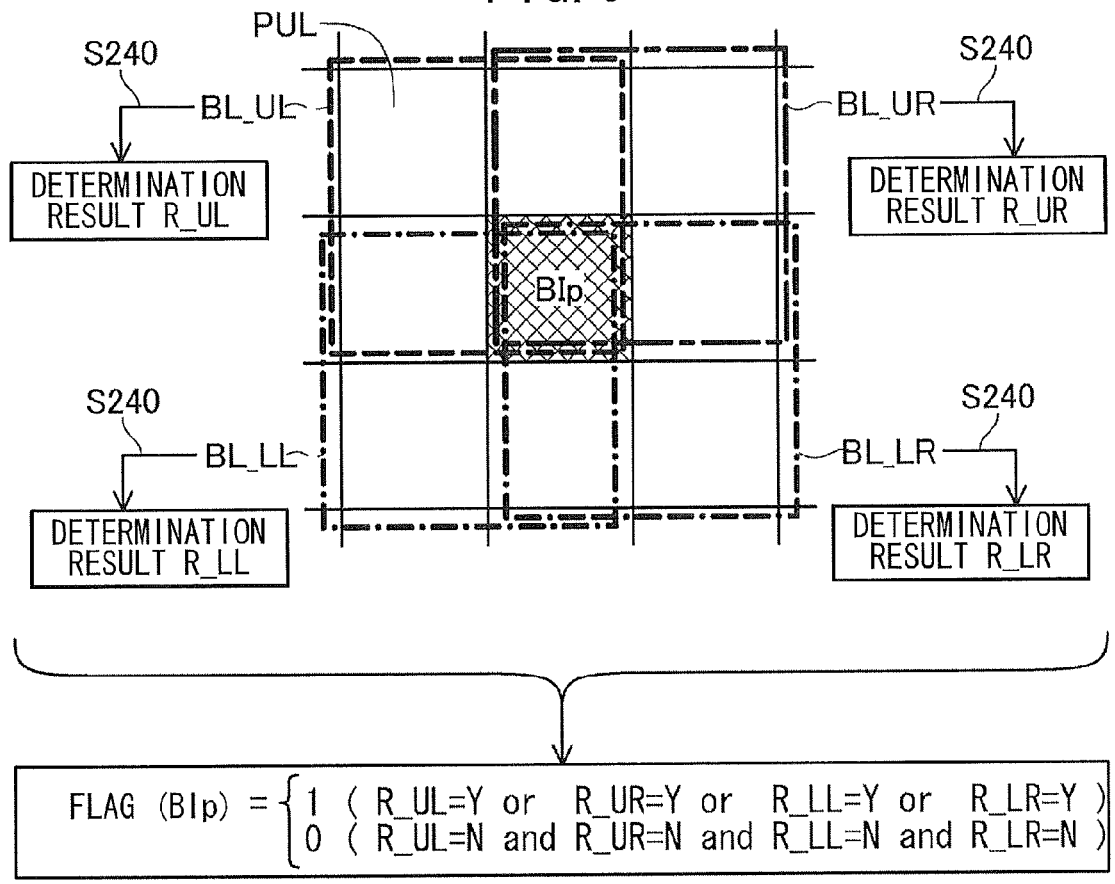
FIG. 9 is a schematic diagram showing four target blocks BL_UL, BL_UR, BL_LL, and BL_LR that overlap a common target pixel BIp.

FIG. 9 is a schematic diagram showing four target blocks BL_UL, BL_UR, BL_LL, and BL_LR that overlap a common target pixel BIp. In FIG. 9, the common target pixel BIp is indicated by shading. As shown in the drawing, the target blocks BL_UL, BL_UR, BL_LL, and BL_LR extend respectively toward the upper left, upper right, lower left, and lower right from the shared target pixel BIp.

As described in FIG. 5, the region identifying unit M122 performs the determination in S240 of the embodiment for each target block BL. Accordingly, four determination results R_UL, R_UR, R_LL, and R_LR obtained through determinations for the four target blocks BL_UL, BL_UR, BL_LL, and BL_LR are applied to the shared target pixel BIp. In the embodiment, determination results representing a uniform region (flag=1) are given priority. As can be seen in the process of FIG. 5, a flag once set to "1" is never returned to "0". Therefore, the flag for the target pixel BIp is set to "1" (indicating a uniform region) if even one determination result among the four determination results R_UL, R_UR, R_LL, and R_LR produces a "Yes" determination in S240. The flag for the target pixel BIp remains "0" (indicating a nonuniform region) when all four determination results R_UL, R_UR, R_LL, and R_LR produce a "No" determination in S240. The same procedure is used for target pixels BIp that are overlapped by only one or two target blocks BL.

The determination results for a plurality of different target blocks BL are used for setting the final determination result of a target pixel BIp constituting a smaller region than the target blocks BL since a plurality of determination results can more suitably identify the type of the smaller region.

Figure 10:
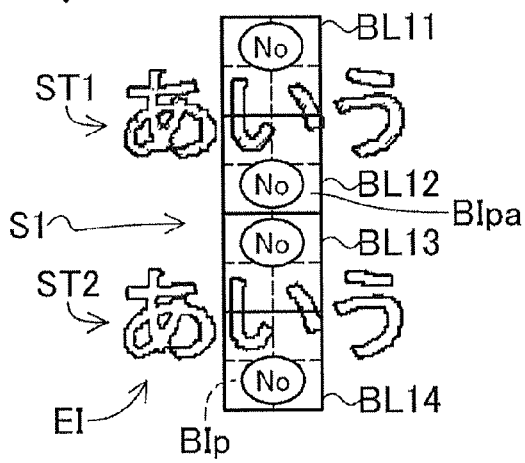
FIG. 10(A) is a schematic diagram illustrating a process for identifying types of small regions.
FIG. 10(B) is a schematic diagram illustrating a process for identifying types of small regions wherein the target blocks BL are set differently from FIG. 10(A)
Figure 10:
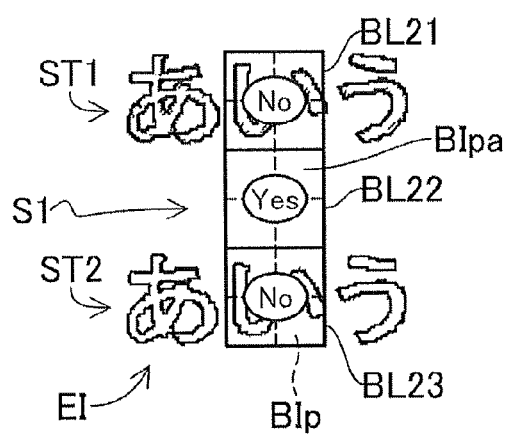

FIGS. 10(A) and 10(B) are schematic diagrams illustrating the process for identifying types of small regions. FIGS. 10(A) and 10(B) illustrate the same portion of an edge image EI. The portion shown in the diagrams represents two character strings ST1 and ST2 extending in the first direction h. FIG. 10(A) also indicates four target blocks BL11-BL14 aligned in the second direction v, while FIG. 10(B) indicates three target blocks BL21-BL23 aligned in the second direction v. The target blocks BL21-BL23 in FIG. 10(B) are produced by shifting the target blocks BL11-BL13 in FIG. 10(A) exactly one pixel (equivalent to one target pixel BIp) in the second direction v. A "Yes" or a "No" is provided in each of the target blocks BL11-BL14 and the target blocks BL21-BL23 to indicate the determination result of the corresponding target block BL (the result of S240 in FIG. 5 described with reference to FIG. 6).

In FIGS. 10(A) and 10(B) a small gap S1 is formed between the two character strings ST1 and ST2. The small gap S1 represents part of the background and will hereinafter be referred to as the background S1. In FIG. 10(A), the second target block BL12 covers part of the character string ST1 and part of the background S1. Similarly, the third target block BL13 covers part of the character string ST2 and part of the background S1. Despite representing the background S1, the target blocks BL12 and BL13 also represent part of the character strings ST1 and ST2 and, hence, their determination results are "No" (indicating a nonuniform region).

In FIG. 10(B), the first and third target blocks BL21 and BL23 cover one character of the character strings ST1 and one character of the strings ST2, respectively. The second target block BL22 covers only the background S1 and not the character strings ST1 and ST2. Consequently, the determination result for the second target block BL22 is "Yes" (indicating a uniform region).

Here, we will take a closer look at a target pixel BIpa representing the background S1 (hereinafter referred to as the "featured pixel BIpa"). The second target block BL12 that includes the featured pixel BIpa (FIG. 10(A)) represents the character string ST1 as well as the background S1. Therefore, the determination result for the second target block BL12 is "No" (nonuniform region). However, the second target block BL22, which also includes the featured pixel BIpa (FIG. 10(B)), represents only the background S1 and not the character strings ST1 and ST2. Accordingly, the determination result for the second target block BL22 is "Yes" (uniform region).

When a plurality of different target blocks BL overlap a common target pixel BIp, as indicated in FIG. 9, each of the target blocks BL expands from the target pixel BIp in a different direction. To rephrase this, when comparing portions of the plurality of target blocks BL, excluding the shared target pixel BIp, each of the target blocks BL includes a different region from the others. For example, the upper left target block BL_UL includes an upper left portion PUL to the upper left of the target pixel BIp, while the other target blocks BL_UR, BL_LL, and BL_LR do not contain the upper left portion PUL. Hence, even though a type of region differing from the featured pixel BIpa (the character string ST1) may exist near the featured pixel BIpa, as shown in FIGS. 10(A) and 10(B), some of the plurality of target blocks BL that overlap the featured pixel BIpa (in this case, the second target block BL22 from among the two target blacks BL12 and BL22) may represent only the same type of region as the featured pixel BIpa (the background S1). Therefore, by giving priority to the determination results of these target blocks over the determination results of other target blocks (in this case, by giving preference to results that set the flag for the featured pixel BIpa to "1"), it is possible to identify the type of target pixel BIp appropriately. Note that this method can suitably identify regions of this specific type, provided that the size of the region of the specific type is approximately equivalent to a single target block BL. In the embodiment, the plurality of target pixels BIp overlapped by the plurality of target blocks BL, as shown in FIG. 8, cover the entire edge image EI (original image OI) without any gaps. Hence, the above method can suitably identify image regions at any position within the original image OI. The method of the embodiment can suitably identify the outline of an image of a certain type, even when the outline has a delicate pattern.

The determination described above is performed for all target blocks BL. After completing the determination for all target blocks BL (i.e., after setting the flag values for all target pixels BIp), the uniform region determination process of FIG. 5 (S110 of FIG. 2) ends.

In S120 of FIG. 2, the consolidating unit M123 consolidates abutting target pixels BIp having the same flag values and labels the regions resulting from this consolidation (hereinafter referred to as "consolidated regions"). Thus, if the two target blocks BL that are arranged without gap and are determined to same one of the uniform region and the nonuniform region, the two target blocks BL are consolidated into the consolidated region. FIG. 11. shows schematic diagrams illustrating the process in S120. The diagram (A) in FIG. 11 shows the target region BI, which underwent the uniform region determination process of S110. Target pixels BIp in the diagram (A) in FIG. 11 that have been shaded with diagonal hatching indicate pixels found to represent uniform regions, while those with no diagonal hatching indicate pixels found to represent nonuniform regions.

The consolidating unit M123 forms continuous regions by repeatedly performing a process to consolidate two abutting target pixels BIp having the same flag values. Here, two target pixels BIp that "abut" each other is meant to indicate that there is no separation between the target pixels BIp. In the embodiment, the condition for determining whether two target pixels BIp abut each other (hereinafter referred to as the "consolidating condition") is that the distance between the two target pixels BIp be no greater than 1.5 pixels. In this case, a single target pixel will abut all of its eight peripheral target pixels. Alternatively, the consolidating condition may be that the distance between the two target pixels BIp be no greater than 1 pixel. In this case, a single target pixel will abut each of the four target pixels positioned directly above, below, left, and right therefrom.

The diagram (B) in FIG. 11 shows the target region BI after completing the consolidating process. The shaded regions in the diagram (B) in FIG. 11 indicate regions determined to be uniform, while the white, non-shaded regions indicate regions determined to be nonuniform. In the example of the diagram (B) in FIG. 11, the plurality of pixels determined to represent nonuniform regions form eight consolidated regions A1a-A1h, while the plurality of pixels determined to represent uniform regions form a single consolidated region A2a. The eight consolidated regions A1a-A1h correspond to the objects in the original image OI shown in FIG. 3(A) (i.e., the text TX, the photograph PH, and the drawn image DR). The consolidated region A2a corresponds to the background in the original image OI.

Next, the consolidating unit M123 labels these consolidated regions by assigning an identifier (label) to each consolidated region formed in the consolidating process. The diagram (C) in FIG. 11 shows the target region BI after undergoing the labeling process. As shown in the diagram (C) in FIG. 11, labels 1-9 have been assigned to the nine consolidated regions formed in the consolidating process.

Next, in S130 of FIG. 2, the attribute determining unit M130 determines detailed attributes of the consolidated regions found to represent nonuniform regions. Possible attributes in the embodiment are a text image (that is, an image indicating at least one letter), a photographic image, and a drawn image. The attribute determining unit M130 performs this attribute determination for each of the consolidated regions formed in S120.

The table in FIG. 12 shows conditions for determining attributes. In the embodiment, the attribute determining unit M130 determines attributes according to a color distribution width W, a color number C, and a pixel density S.

The graph in FIG. 13 will be used to illustrate the color distribution width W and the color number C. FIG. 13 shows a brightness histogram. The brightness histogram indicates brightness values calculated from pixel values in a single consolidated region of the original image OI, where brightness in the embodiment is expressed by an integer between 0 and 255. As described above with reference to FIG. 6, the target pixels BIp in the target region BI have the predetermined correlation with edge pixels EIP in the edge image EI (i.e., the original image OI). Thus, because the edge image EI is generated by the original image, the target pixels BIp in the target region BI have also a predetermined correlation with pixels in the original image. Consolidated regions in the original image OI are identified based on these correlations. In other words, when the target region BI overlaps the original image OI, the consolidated region in the original image OI overlaps the consolidated region in the target region BI. Further, pixels representing substantially the same color as the background have been omitted from this histogram. In the embodiment, the background color is the color of the region determined to represent a uniform region. For example, the color represented by the average pixel value in the uniform region may be used as the background color. Subsequently, pixels having colors that differ from the background color at most a prescribed value (specifically, pixels whose color component values differ from those of the background by at most a prescribed threshold) are omitted from the histogram.

The color number C is the cumulative width of brightness for which the frequency (pixel count) exceeds a prescribed threshold Th. The color number C can be calculated by multiplying the total number intervals (referred to as "bins") in which the frequency exceeds the threshold Th by the width of a single bin. The sample histogram shown in FIG. 13 indicates three peaks P1, P2, and P3 that exceed the threshold Th. The color number C in this case is the sum of the width C1 for the portion of the first peak P1 that exceeds the threshold Th, the width C2 for the portion of the second peak P2 that exceeds the threshold Th, and the width C3 for the portion of the third peak P3 that exceeds the threshold Th. Since characters are generally rendered with few colors, the color number C is smaller when the consolidated region represents text. The color number C is larger when the consolidated region represents a photographic image since the photographed subjects are normally represented by a variety of colors. Drawn images are often rendered with more colors than text, but usually have fewer colors than found in photographic images. Hence, when the consolidated region represents a drawn image, the color number C tends to be larger than a color number C for a text image but smaller than the color number C for a photographic image.

The color distribution width W is the difference (width) between the minimum value and maximum value of brightnesses for which the frequency (pixel count) exceeds the prescribed threshold Th (bins). For the same reasons described above for the color number C, the color distribution width W is smaller when the consolidated region represents text and larger when the consolidated region represents a photograph. Similarly, when the consolidated region represents a drawn image, the color distribution width W tends to be larger than the color distribution width W for a text image and smaller than the color distribution width W for a photograph.

The pixel density S represents the number of pixels per unit area in the consolidated region for pixels remaining after excluding those pixels that express substantially the same color as the background. Pixels representing substantially the same color as the background are the same pixels excluded from the histogram. Normally, characters are written in fine lines on the background using a color that differs from the background. Accordingly, the pixel density S is smaller when the consolidated region represents text. Most parts of a photographic image are rendered in colors that differ from the background. Consequently, the pixel density S is larger when the consolidated region represents a photograph. As with text, drawn images are generally rendered on the background in colors different from the background. However, unlike text, drawn images are not limited to fine lines, but may include thicker lines and filled regions. Hence, when the consolidated region represents a drawn image, the pixel density S tends to be larger than the pixel density S for a text image but smaller than the pixel density S for a photographic image.

The determination conditions in FIG. 12 take into account the following characteristics. Specifically, the attribute determining unit M130 selects an attribute associated with a combination of the following three determination results.
Determination 1) Is the color distribution width W greater than or equal to a prescribed distribution width threshold Wth?
Determination 2) Is the color number C greater than or equal to a prescribed color number threshold Cth?
Determination 3) Is the pixel density S greater than or equal to a prescribed pixel density threshold Sth?

For example, when the color distribution width W is less than the distribution width threshold Wth, the color number C is less than the color number threshold Cth, and the pixel density S is less than the pixel density threshold Sth, the attribute determining unit M130 determines that the attribute for the consolidated region is a text image.

Specifically, the attribute determining unit M130 generates a histogram such as that shown in FIG. 13, calculates the color distribution width W and the color number C by analyzing the histogram, and calculates the pixel density S by analyzing the consolidated region in the original image OI. Next, the attribute determining unit M130 uses the calculated color distribution width W, color number C, and pixel density S to determine the attribute for the consolidated region. The attribute determining unit M130 determines attributes for all consolidated regions that were found to represent nonuniform regions. The image analysis process of FIG. 2 ends at the completion of these determinations. The printing process unit M200 performs image correction on each of the consolidated regions in the original image GI based on their attributes. For example, the printing process unit M200 may perform a process to enhance the sharpness of a consolidated region representing a text image. The multifunction peripheral 200 may also perform a preset color correction process on consolidated regions representing photographs in order to print the photographs in preferred colors. The printing process unit M200 then prints the image by supplying image data representing the corrected image to the printing unit 250.

In the embodiment described above, the characteristic value calculating unit M121 calculates the average pixel values AveR, AveG, and AveB for each of the plurality of target blocks BL arranged at different positions over the edge image EI (S230 of FIG. 5). These average pixel values AveR, AveG, and AveB are the average values of the edge strength Sed shown in FIG. 4 and, therefore, represent the degree of edge strength. As described in S240 of FIG. 5 and with reference to FIG. 7, the region identifying unit M122 determines that the target block BL represents a uniform region when the average pixel values AveR, AveG, and AveB satisfy the uniform condition and determine that the target block BL represents a nonuniform region when the average pixel values AveR, AveG, and AveB do not satisfy the uniform condition. The uniform condition is satisfied when the average pixel values (edge strength) for all red, green, and blue color components are smaller than the prescribed threshold Th_BG and is not satisfied when the average pixel value for even one of the color components is greater than or equal to the prescribed threshold Th_BG. Hence, the uniform condition is used to determine whether the degree of edge strength represented by the average pixel values is greater than or equal to a prescribed reference value. Since the average pixel values representing the degree of edge strength are used to differentiate nonuniform regions from uniform regions, this method can improve the accuracy for identifying regions of different types. For example, this method can appropriately separate regions representing text from regions representing the background, even when the text color is similar to the background color because the edge strength in a region representing text is higher than that in a region representing the background.

Further, uniform regions are determined using the average value of a plurality of edge pixels EIp (edge strength) in a target block BL. Averaging a plurality of values can mitigate the effects of noise that may be included in the original image OI or the edge image EI, resulting in increased accuracy for identifying regions of different types. Regions representing the background in the original image OI or the edge image EI may contain noise that was produced during optical scanning or image processing, for example. The method of the embodiment reduces the potential for incorrectly identifying regions representing the background as a nonuniform region, even in such cases.

As described with reference to FIG. 8, a plurality of target blocks BL are arranged so that each target block BL overlaps a region (target pixel BIp) that is partially shared by at least one other target block BL. For a shared region that is overlapped by a plurality of target blocks BL, such as the target pixel BIp shown in FIG. 9, the determination results for the plurality of target blocks BL overlapping the target pixel BIp are combined to identify the type of the shared region, thereby suitably identifying the types of small regions having a size approximately equivalent to the size of the target block BL. A particular feature of the embodiment is that determination results indicating a uniform region are given priority, as described with reference to FIGS. 9, 10(A), and 10(B). This method reduces the potential for incorrectly identifying uniform regions as nonuniform regions.

As described with reference to FIG. 8, the target blocks BL are arranged in the embodiment so that shared regions of the target blocks BL (target pixels BIp) cover nearly the entire target region BI (i.e., the original image OI) with almost no gaps, excluding the target pixels BIp in the four corners of the target region BI. This configuration makes it possible to suitably identify the types of small regions of approximately the same size as the target blocks BL across nearly the entire original image OI.

As described in S120 of FIG. 2 and with reference to FIG. 11, the consolidating unit M123 of the embodiment combines two abutting regions (target pixels BIp) into a single region when determining that the two abutting regions are the same type. As a result, the consolidating unit M123 can consolidate a plurality of target pixels BIp representing a single object (text, for example) into a single region. In other words, a large region representing a single object can be identified as a single region, resulting in improved accuracy for identifying regions of different types.

While the invention has been described in detail with reference to the embodiment thereof, it would be apparent to those skilled in the art that various changes and modifications may be made therein without departing from the scope of the invention.

Variation 1

The method of computing edge strength is not limited to the equation in FIG. 4, but may be any equation capable of computing a value representing the magnitude of change in pixel values. For example, the edge strength may be calculated by totaling the square of the sum of the square of first direction component Sx and the square of second direction component Sy and taking the square root of the sum, or may be calculated using the Prewitt operator. Further, the edge strength need not be calculated based on the red, green, and blue color components, but may be calculated based on pixel values of other color components, such as brightness.

Variation 2

The characteristic value calculated for each target block BL to represent the degree of edge strength may be any value representing the degree of edge strength and is not limited to the average value of edge strength (the average pixel values AveR, AveG, and AveB). For example, the characteristic value may be the mode value of edge strength. This characteristic value can also suitably mitigate the effects of noise. Alternatively, both the average value and the mode value may be used as characteristic values. The characteristic value may alternatively be another type of value expressing the distribution characteristic of edge strength (such as a maximum value or a median). The average characteristic value for a plurality of color components (red, green, and blue, for example) may also be employed as the final characteristic value (for example, characteristic value=(AveR+AveG+AveB)/3).

The uniform condition used in the determination made in S240 of FIG. 5 and described with reference to FIG. 7 is not limited to the condition shown in FIG. 7 but may be any condition for determining whether the degree of edge strength represented by the characteristic value exceeds a prescribed reference. In other words, the region identifying unit M122 may determine whether at least one value characterizing edge strength satisfies a prescribed criterion. For example, the threshold value may be set differently for each color component. Alternatively, the average characteristic value for the plurality of color components (red, green, and blue, for example) may be compared to a single threshold value. When the characteristic value includes a plurality of types (such as an average value and a mode value), generally predetermined threshold values are set for the plurality of types. The predetermined threshold value is used for the corresponding type of the characteristic value to determine the magnitude of the characteristic value. It is subsequently judged whether the degree of edge strength is greater than or equal to the prescribed reference based on these determination results. As in the example of FIG. 7, the condition that the characteristic values of all types by smaller than their threshold values may be used as the uniform condition.

Variation 3

The block size BLsize (FIG. 6) is also not limited to 32 but may be any of a plurality of values, such as 64, 128, and the like. In this case, the uniform region determination is less likely to be affected by noise the larger the block size BLsize. However, the minimum size of regions that can be distinguished as uniform and nonuniform remains one target block BL. Hence, by using a smaller block size BLsize, it is possible to identify the types of smaller regions suitably. Accordingly, the block size BLsize is preferably set to achieve a balance.

The target pixel number BLn (FIG. 6) is also not limited to 2, but may be any of a plurality of values, such as 3, 4, 5, and the like. Since positional displacement of the target block BL over the edge image EI is smaller (the density of target blocks BL is higher) with a larger target pixel number BLn, the type of small regions can be suitably identified. On the other hand, larger target pixel numbers BLn increase the required process time. Therefore, the target pixel number BLn is preferably set to achieve a balance.

In addition, the aspect ratio of the target block BL is not limited to 1:1, nor is the aspect ratio of the target pixel BIp. Further, the total number of target blocks BL overlapping a single target pixel BIp may be any number and is not limited to 4.

Variation 4

When identifying the type of a shared region overlapped by a plurality of target blocks BL (a target pixel BIp), priority is given to uniform regions as is described with reference to FIG. 9. However, priority may be given to nonuniform regions instead of uniform regions. This method reduces the potential for mistakenly identifying nonuniform regions as uniform regions. The type of a shared region overlapped by a plurality of target blocks BL (a target pixel BIp) may be identified by any type of method that leads to a single (final) determination result using determination results for the plurality of target blocks BL overlapping the shared region. For example, the type of the shared region may be determined based on the majority of the determination results.

The image undergoing the uniform region determination using the target block BL (hereinafter referred to as the "target image") may be part of the original image OI instead of the entire original image OI. In this case, the image process unit M100 performs the image analysis process using the portion of image data representing the target image from among the image data representing the original image OI. In either case, a plurality of target blocks BL are arranged so that a plurality of distinct shared regions (target pixels BIp), each of which is overlapped by a plurality of target blocks BL, cover a specific continuous region (hereinafter, referred to as the specific region) occupying at least part of the target image so that there are no gaps between shared regions. In this way, the type of the shared regions in the specific region can be identified using a plurality of target blocks BL. Thus, even when the region representing a single type of region (such as text or background) is small, the region can be accurately identified. Regions can be accurately identified at any position within the specific region. This method can also suitably identify outlines in an image of a single type within the specific region when the outlines describe a delicate pattern, thereby improving the precision for identifying regions of a different type. The plurality of target blocks BL may be arranged so as not to overlap in regions of the target image, excluding the specific region. The specific region preferably covers substantially the entire target image (the target region BI; i.e., the original image OI), as in the example shown in FIG. 8. The target image and the specific region may also be set by the user. Alternatively, the target blocks BL may also be arranged so as not to overlap each other across the entire target image.

Variation 5

Step S130 may be omitted from the image analysis process of FIG. 2 (in which case, the attribute determining unit M130 of FIG. 1 may be omitted). In this case, the printing process unit M200 may alter image correction on uniform regions and nonuniform regions. In addition, step S120 may be omitted from the image analysis process of FIG. 2 (in which case, the consolidating unit M123 of FIG. 1 may be omitted).

The results of the uniform region determinations may also be used in other processes and not just for image correction. For example, when digital text data is generated from text images through an optical character recognition (OCR) process, regions determined to be nonuniform may be selected as targets for the OCR process. Also, when displaying images on a display device, regions determined to be nonuniform may be displayed in an enlarged format. Further, the data used in the image analysis process (uniform region determinations) may be image data supplied from another device, such as the computer 100.

The image processor implementing the image processes described in the embodiment is not limited to the multifunction peripheral 200 in the embodiment, and may be configured of another type of device, such as a computer built into a printer, a digital camera, a scanner, or other image-related device; a common personal computer; or a server connected to a network. Alternatively, the functions required for implementing the image processes of the embodiment may be divided among a plurality of computers that can communicate over a network so that together the computers can provide all necessary functions (the technology for this type of computer system is also referred to as cloud computing).

Variation 6

The attributes identified in S130 of FIG. 2 are not limited to the three shown in FIG. 12 (text image, photographic image, and drawn image), but may include attributes of any number. However, the attributes identified in this process preferably include at least the text image, because text images are more commonly subjected to special processes than other images. For example, an OCR process is performed on a text image to produce digitized text data. Hence, by identifying whether regions determined to be nonuniform represent text images and subjecting only those representing text images to the OCR process or other special process, it is possible to reduce the process time.

The method used to identify attributes is not limited to the method described in FIGS. 12 and 13. For example, it is possible to determine whether the attribute of a region is a text image using pattern matching with prepared character images.

Variation 7

Part of the process implemented in hardware in the embodiments may be replaced with software processes, while conversely part of the processes implemented in software may be replaced with a hardware configuration. As an example, the function of the uniform region determining unit M120 in FIG. 1 may be implemented with logic circuits in hardware.

If part or all of the functions according to the invention are implemented in software (computer programs), this software can be supplied on a recording medium in a format that can be read by a computer. The "recording medium that can be read by a computer" is not limited to a portable recording medium, such as a memory card or CD-ROM, but may be an internal storage device of a computer such as RAM or ROM, or an external storage device such as an external hard disk drive that is connected to a computer.

What is claimed is:

1. An image processing device comprising:
   a processor; and
   a memory storing computer-readable instructions therein, the computer-readable instructions, when executed by the processor, causing the image processing device to perform:
   generating edge image data by using original image data, the edge image data representing an edge image that includes a plurality of pixels, each of the plurality of pixels having an edge strength;
   arranging a first determination region and a second determination region in the edge image, the first determination region and the second determination region having a same size, the first determination region having a first partial region, the second determination region having a second partial region, a position of the first partial region being the same as a position of the second partial region;
   creating a first characteristic value using edge strengths of a plurality of pixels arranged in the first determination region and a second characteristic value using edge strengths of a plurality of pixels arranged in the second determination region;
   determining whether the first characteristic value satisfies a prescribed criterion and whether the second characteristic value satisfies the prescribed criterion; and
   identifying:
   when the first characteristic value and the second characteristic value satisfy the prescribed criterion, the first determination region and the second determination region as a nonuniform region;
   when neither the first characteristic value nor the second characteristic value satisfies the prescribed criterion, the first determination region and the second determination region as a uniform region;

when the first characteristic value satisfies the prescribed criterion and the second characteristic value does not satisfy the prescribed criterion, the first determination region except the first partial region as the nonuniform region, the second determination region except the second partial region as the uniform region, and the first partial region as a specific one of the nonuniform region and the uniform region; and when the first characteristic value does not satisfy the prescribed criterion and the second characteristic value satisfies the prescribed criterion, the first determination region except the first partial region as the uniform region, the second determination region except the second partial region as the nonuniform region, and the first partial region as the specific one of the nonuniform region and the uniform region.

2. The image processing device according to claim 1, wherein the computer-readable instructions, when executed by the processor, cause the image processing device to perform:
determining that:
the first characteristic value satisfies the prescribed criterion when the first characteristic value is greater than or equal to a prescribed reference value; and
the second characteristic value satisfies the prescribed criterion when the second characteristic value is greater than or equal to the prescribed reference value.

3. The image processing device according to claim 1, wherein the first characteristic value is one of an average value of the edge strengths of the plurality of pixels arranged in the first determination region and a mode value of the edge strengths of the plurality of pixels arranged in the first determination region, and the second characteristic value is one of an average value of the edge strengths of the plurality of pixels arranged in the second determination region and a mode value of the edge strengths of the plurality of pixels arranged in the second determination region.

4. The image processing device according to claim 1, wherein the first determination region partially overlaps the second determination region at the position of the first partial region,
wherein the computer-readable instructions, when executed by the processor, cause the image processing device to perform identifying, when the first characteristic value satisfies the prescribed criterion and the second characteristic value does not satisfy the prescribed criterion, the first partial region as the nonuniform region.

5. The image processing device according to claim 1, wherein the first determination region partially overlaps the second determination region at the position of the first partial region,
wherein the computer-readable instructions, when executed by the processor, cause the image processing device to perform identifying when the first characteristic value satisfies the prescribed criterion and the second characteristic value does not satisfy the prescribed criterion, the first partial region as the uniform region.

6. The image processing device according to claim 1, wherein the computer-readable instructions, when executed by the processor, cause the image processing device to perform arranging a plurality of determination regions, the plurality of determination regions includes a plurality of partial regions,
wherein one of the plurality of determination regions and other one of the plurality of determination regions have partial regions at a same position whereby the one of the plurality of determination regions partially overlaps the other one of the plurality of determination regions at the position of the partial region,
wherein the plurality of partial regions being arranged without gap.

7. The image processing device according to claim 1, wherein the computer-readable instructions, when executed by the processor, cause the image processing device to perform consolidating, when the first determination region and the second determination region are arranged without gap and both the two of the plurality of determination regions first determination region and the second determination region are identified as same one of the nonuniform region and the uniform region, the first determination region and the second determination region into a consolidated region in the edge image, the consolidated region corresponding to a region of the original image.

8. The image processing device according to claim 7, wherein the computer-readable instructions, when executed by the processor, cause the image processing device to perform determining whether or not the consolidated region consolidated from the first determination region and the second determination region identified as the nonuniform region corresponds to a letter region in the original image, the letter region representing a letter.

9. The image processing device according to claim 1, wherein each of the uniform region and the nonuniform region corresponds to a region in the original image,
wherein an image in the nonuniform region is nonuniformly formed and an image in the uniform region is uniformly formed.

10. A non-transitory computer-readable storage medium storing computer-readable instructions that, when executed by a processor, cause an image processing device to perform:
generating edge image data by using original image data, the edge image data representing an edge image that includes a plurality of pixels, each of the plurality of pixels having an edge strength;
arranging a first determination region and a second determination region in the edge image, the first determination region and the second determination region having a same size, the first determination region having a first partial region, the second determination region having a second partial region, a position of the first partial region being the same as a position of the second partial region;
creating a first characteristic value using edge strengths of a plurality of pixels arranged in the first determination region and a second characteristic value using edge strengths of a plurality of pixels arranged in the second determination region;
determining whether the first characteristic value satisfies a prescribed criterion and whether the second characteristic value satisfies the prescribed criterion; and
identifying:
when the first characteristic value and the second characteristic value satisfy the prescribed criterion, the first determination region and the second determination region as a nonuniform region;
when neither the first characteristic value nor the second characteristic value satisfies the prescribed criterion, the first determination region and the second determination region as a uniform region;

when the first characteristic value satisfies the prescribed criterion and the second characteristic value does not satisfy the prescribed criterion, the first determination region except the first partial region as the nonuniform region, the second determination region except the second partial region as the uniform region, and the first partial region as a specific one of the nonuniform region and the uniform region; and when the first characteristic value does not satisfy the prescribed criterion and the second characteristic value satisfies the prescribed criterion, the first determination region except the first partial region as the uniform region, the second determination region except the second partial region as the nonuniform region, and the first partial region as the specific one of the nonuniform region and the uniform region.

11. A method for controlling an image processing device, the method comprising:

generating edge image data by using original image data, the edge image data representing an edge image that includes a plurality of pixels, each of the plurality of pixels having an edge strength;

arranging a first determination region and a second determination region in the edge image, the first determination region and the second determination region having a same size, the first determination region having a first partial region, the second determination region having a second partial region, a position of the first partial region being the same as a position of the second partial region;

creating a first characteristic value using edge strengths of a plurality of pixels arranged in the first determination region and a second characteristic value using edge strengths of a plurality of pixels arranged in the second determination region;

determining whether the first characteristic value satisfies a prescribed criterion and whether the second characteristic value satisfies the prescribed criterion; and identifying:

when the first characteristic value and the second characteristic value satisfy the prescribed criterion, the first determination region and the second determination region as a nonuniform region;

when neither the first characteristic value nor the second characteristic value satisfies the prescribed criterion, the first determination region and the second determination region as a uniform region;

when the first characteristic value satisfies the prescribed criterion and the second characteristic value does not satisfy the prescribed criterion, the first determination region except the first partial region as the nonuniform region, the second determination region except the second partial region as the uniform region, and the first partial region as a specific one of the nonuniform region and the uniform region; and when the first characteristic value does not satisfy the prescribed criterion and the second characteristic value satisfies the prescribed criterion, the first determination region except the first partial region as the uniform region, the second determination region except the second partial region as the nonuniform region, and the first partial region as the specific one of the nonuniform region and the uniform region.

12. The image processing device according to claim 1, wherein the first determination region and the second determination region include a plurality of small regions, wherein the first partial region is one of the small regions included in the first determination region, wherein the second partial region is one of the small regions included in the second determination region, and wherein the first determination region is arranged next to another one of the small regions included in the second determination region which is different from the second partial region.

* * * * *